(12) United States Patent
Hamada et al.

(10) Patent No.: US 10,845,247 B2
(45) Date of Patent: Nov. 24, 2020

(54) INFRARED TEMPERATURE SENSOR

(71) Applicant: SHIBAURA ELECTRONICS Co., LTD, Saitama (JP)

(72) Inventors: Morihisa Hamada, Saitama (JP); Tastuya Konno, Saitama (JP); Yuko Higuchi, Saitama (JP); Kyohei Kamata, Saitama (JP)

(73) Assignee: SHIBAURA ELECTRONICS CO., LTD, Saitama (JP)

( * ) Notice: Subject to any disclaimer, the term of this patent is extended or adjusted under 35 U.S.C. 154(b) by 60 days.

(21) Appl. No.: 16/096,216

(22) PCT Filed: Jun. 5, 2017

(86) PCT No.: PCT/JP2017/020818
§ 371 (c)(1),
(2) Date: Oct. 24, 2018

(87) PCT Pub. No.: WO2017/217272
PCT Pub. Date: Dec. 21, 2017

(65) Prior Publication Data
US 2019/0137342 A1    May 9, 2019

(30) Foreign Application Priority Data

Jun. 13, 2016 (JP) ................................ 2016-117128

(51) Int. Cl.
*G01J 5/04* (2006.01)
*G01J 5/00* (2006.01)
(Continued)

(52) U.S. Cl.
CPC .............. *G01J 5/04* (2013.01); *G01J 5/0022* (2013.01); *G01J 5/06* (2013.01); *G01J 5/0818* (2013.01);
(Continued)

(58) Field of Classification Search
None
See application file for complete search history.

(56) References Cited

U.S. PATENT DOCUMENTS

| 2014/0140712 A1* | 5/2014 | Nakayama | G01J 5/0853 399/33 |
| 2016/0169745 A1* | 6/2016 | Nojiri | G01J 5/10 374/121 |

FOREIGN PATENT DOCUMENTS

| JP | 2006118993 A | 5/2006 |
| JP | 2012098088 A | 5/2012 |

(Continued)

OTHER PUBLICATIONS

International Search Report for PCT/JP2014/020818 dated Aug. 22, 2017.

*Primary Examiner* — Hoon K Song
(74) *Attorney, Agent, or Firm* — Pearne & Gordon LLP

(57) ABSTRACT

An infrared temperature sensor includes a sensor case, a heat conversion film configured to absorb infrared rays and to convert the infrared rays into heat, a sensor cover that is disposed to face the sensor case through the heat conversion film, and an infrared detection element and a temperature compensation element that are disposed on the heat conversion film. The sensor case includes a case base portion that includes a front surface and a rear surface, a light guiding region that is provided to penetrate through the front surface and the rear surface of the case base portion, and a light shielded region that is provided inside a light shielding dome erected from the front surface side of the case base portion.

9 Claims, 5 Drawing Sheets

(51) Int. Cl.
*G01J 5/10* (2006.01)
*G01J 5/06* (2006.01)
*G01J 5/08* (2006.01)

(52) U.S. Cl.
CPC ........... *G01J 5/10* (2013.01); *G01J 2005/065* (2013.01); *G01J 2005/068* (2013.01)

(56) References Cited

FOREIGN PATENT DOCUMENTS

| | | |
|---|---|---|
| JP | 5207329 B1 | 3/2013 |
| JP | 2014149300 A | 8/2014 |
| JP | 2015172537 A | 10/2015 |
| WO | 2015020081 A1 | 2/2015 |

* cited by examiner

INFRARED TEMPERATURE SENSOR

CROSS-REFERENCE TO RELATED APPLICATIONS

This is a National Stage application of PCT international application PCT/JP2017/020818, filed on Jun. 5, 2017 which claims the priority of Japan Patent Application No. 2016-117128, filed Jun. 13, 2016, both of which are incorporated herein by reference in their entirety.

TECHNICAL FIELD

The present invention relates to an infrared temperature sensor that detects temperature of a detection object in a non-contact manner.

BACKGROUND ART

As a toner fixer used in an image forming apparatus such as a copier and a printer, a toner fixer of the following type is generally used. In the toner fixer, a toner image corresponding to image information is formed on a recording sheet through an electrophotographic operating process, and then unfixed toner is heated and fixed while the recording sheet is moved.

The fixer presses the recording sheet and the toner carried on the recording sheet by static electricity between fixing means and pressurizing means, and moves the recording sheet and the toner while applying heat and pressure, thereby fusing and fixing the toner on the recording sheet. The fixing means includes a roller that conveys the recording sheet and the toner while rotating. The pressurizing means includes a roller that rotates in a direction opposite to the direction of the fixing means in press contact with the fixing means. The toner contains a resin material, a magnetic substance, and a colorant.

Temperature of the roller of the fixer largely influences image quality. Therefore, to control the temperature of the roller, temperature of a surface of the roller is detected by a sensor. An infrared temperature sensor that can detect temperature in a non-contact manner is used for the temperature detection in order to avoid damage of the roller. The infrared temperature sensor includes an infrared detection element and a temperature compensation element, detects, by the infrared detection element, a radiation heat quantity of infrared rays of a roller that is the fixing means as a detection object, and further detects atmospheric temperature by the temperature compensation element to compensate the temperature, thereby specifying the temperature of the detection object.

The applicant proposes, in Patent Literature 1, the infrared temperature sensor that can accurately measure the surface temperature of the detection object even in a severe detection temperature environment. More specifically, in the infrared temperature sensor disclosed in Patent Literature 1, a light guiding region corresponding to the infrared detection element and a light shielded region corresponding to the temperature compensation element are formed in substantially symmetric shapes, which makes it possible to make heat energy received by the infrared detection element and heat energy received by the temperature compensation element equivalent to each other, excluding irradiation of the infrared rays. Further, the infrared temperature sensor disclosed in Patent Literature 1 calculates a difference between the detected temperature by the infrared detection element and the detected temperature by the temperature compensation element, to accurately detect only heat energy caused by the irradiation of the infrared rays.

CITATION LIST

Patent Literature

Patent Literature 1: JP 5207329 B2

SUMMARY OF INVENTION

Technical Problem

An object of the present invention is to provide an infrared temperature sensor that makes it possible to cope with downsizing while securing detection sensitivity that allows for accurate measurement of surface temperature of a detection object.

Solution to Problem

An infrared temperature sensor according to the present invention is a sensor that detects temperature of a detection object in a non-contact manner, and includes a sensor case including a light guiding region that guides infrared rays entering from an entrance window, and a light shielded region that is adjacent to the light guiding region and is closed from surroundings, a film that is disposed to face the light guiding region and the light shielded region and is configured to absorb the infrared rays reaching through the light guiding region and to convert the infrared rays into heat, a sensor cover that is disposed to face the sensor case through the film, an infrared detection element that is disposed at a part of the film corresponding to the light guiding region, and a temperature compensation element that is disposed at a part of the film corresponding to the light shielded region.

The sensor case according to the present invention includes a case base portion that includes a front surface and a rear surface, the light guiding region that is provided to penetrate through the front surface and the rear surface of the case base portion, and the light shielded region that is provided inside a light shielding dome erected from a side of the front surface of the case base portion. The sensor cover according to the present invention includes a cover base portion that is abutted to the rear surface of the case base portion, and a side wall that is inclinedly erected from the cover base portion and surrounds the infrared detection element and the temperature compensation element.

In the infrared temperature sensor according to the present invention, the light guiding region is provided to penetrate through the front surface and the rear surface of the case base portion, and a part that blocks the infrared rays radiated from the detection object from entering the light guiding region through the infrared entrance window is not present except for the light shielding dome. Therefore, the infrared temperature sensor according to the present invention secures an amount of infrared rays taken into the light guiding region and accordingly secures detection sensitivity even when the infrared temperature sensor is downsized.

In the infrared temperature sensor according to the present invention, in order to achieve the effects, at least the front surface of the case base portion preferably includes a flat surface, and the light guiding region is preferably provided within a thickness range of the case base portion from the front surface to the rear surface.

In the infrared temperature sensor according to the present invention, the sensor cover preferably includes a truncated conical element accommodating portion that includes the side wall and a bottom floor connecting a front end of the side wall.

In the infrared temperature sensor according to the present invention, the element accommodating portion preferably includes the bottom floor formed in a rectangular shape and a rectangular opening that receives the infrared detection element and the temperature compensation element, and is preferably formed in a truncated square pyramid shape.

In the infrared temperature sensor according to the present invention, the sensor cover is preferably formed by performing press processing on a part of the cover base portion.

In the infrared temperature sensor according to the present invention, the light shielding dome preferably includes an inclined region that is a peripheral edge communicating with the case base portion and is adjacent to at least the light guiding region.

This makes it possible to suppress a degree of blocking the infrared rays radiated from the detection object from entering the infrared entrance window.

In the infrared temperature sensor according to the present invention, the light guiding region can be formed by stamping a predetermined range of the case base portion, and the light shielding dome can be formed by performing press processing on a part of the case base portion. When the sensor case is fabricated by stamping and press processing in the above-described manner, it is possible to manufacture the infrared temperature sensor at a low cost as compared with a case where the sensor case is fabricated by, for example, casting.

In the infrared temperature sensor according to the present invention, the light guiding region and the light shielded region are preferably formed in substantially symmetric shapes. This makes heat energy received by the infrared detection element and heat energy received by the temperature compensation element equivalent to each other, excluding irradiation of the infrared rays.

As a specific form, the light guiding region including the entrance window preferably includes a rectangular planar shape, the light shielding dome preferably includes a truncated square pyramid outer shape, and the light shielded region preferably includes a space tapered from a side of the rear surface.

Further, as with the above description, in order to make heat energy received by the infrared detection element and heat energy received by the temperature compensation element equivalent to each other, excluding irradiation of the infrared rays, in the infrared temperature sensor according to the present invention, the infrared detection element and the temperature compensation element are preferably disposed at substantially symmetric positions with a boundary between the light guiding region and the light shielded region as an axis.

In the infrared temperature sensor according to the present invention, the sensor cover preferably includes a notch within a predetermined range forward of a rear end of the cover base portion. An electric wire fixing region that accommodates and fixes an electric wire connected to the infrared detection element and the temperature compensation element is preferably formed by the notch of the cover base portion and the case base portion in a region facing the notch. The cover base portion preferably has a thickness that is larger than a thickness of the case base portion and is equal to or larger than a thickness of the electric wire.

According to the infrared temperature sensor, it is possible to fit the electric wire within the electric wire fixing region so as not to be protruded from the cover base portion in the thickness direction.

Advantageous Effects of Invention

According to the infrared temperature sensor of the present invention, the light guiding region is provided to penetrate through the front surface and the rear surface of the case base portion, and a part that blocks the infrared rays radiated from the detection object from entering the light guiding region through the infrared entrance window is not present except for the light shielding dome. Therefore, the infrared temperature sensor according to the present invention secures the amount of infrared rays taken into the light guiding region and accordingly secures detection sensitivity even when the infrared temperature sensor is downsized.

DESCRIPTION OF EMBODIMENT

An infrared temperature sensor 10 according to the present invention is described in detail below based on an embodiment illustrated in accompanying drawings.

Figure 4A:
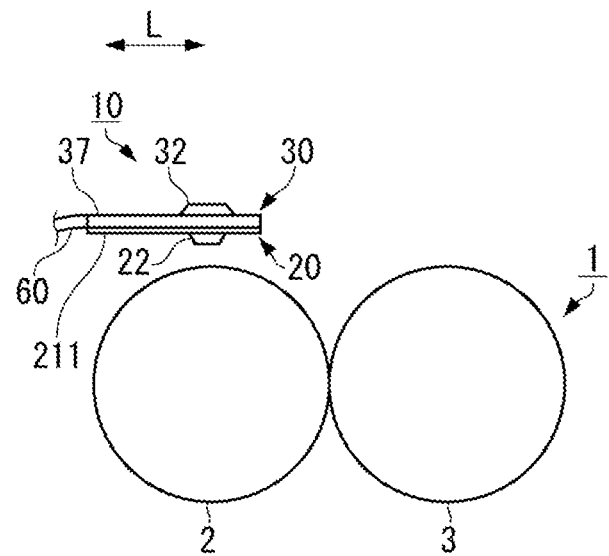
FIGS. 4A and 4B are configuration diagrams each illustrating a schematic configuration of a fixer according to the present embodiment, FIG. 4A being a front view, and FIG. 4B being a side view.
Figure 4B:
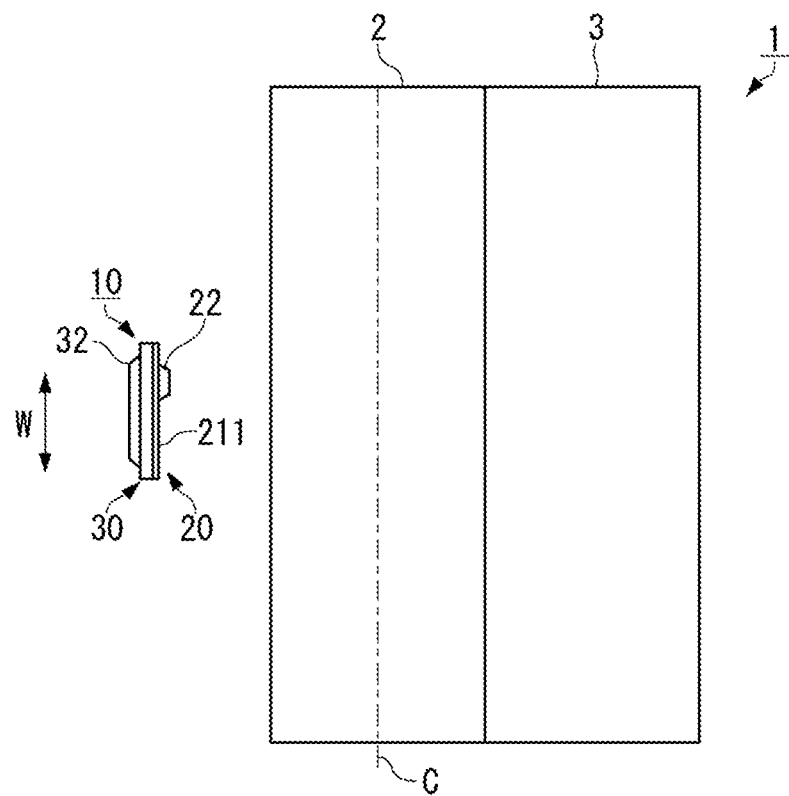

For example, as illustrated in FIGS. 4A and 4B, the infrared temperature sensor 10 is a sensor that detects temperature of a roller 2 in a non-contact manner. The roller 2 is fixing means of a toner fixer 1 used in an image forming apparatus such as a copier and a printer. The toner fixer 1 includes the roller 2 as the fixing means, and a roller 3 as pressurizing means.

Figure 1A:
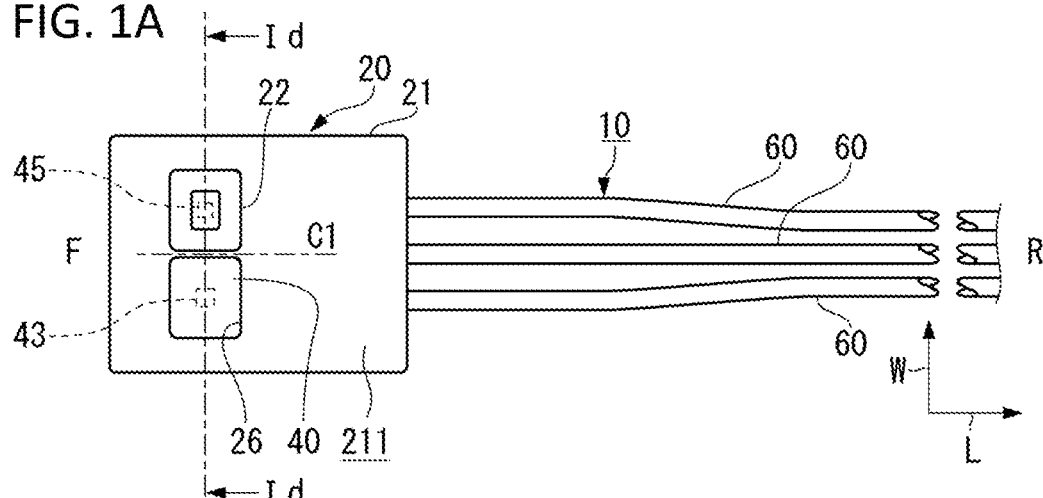
FIGS. 1A to 1D each illustrate an infrared temperature sensor according to an embodiment of the present invention, FIG. 1A being a plan view, FIG. 1B being a side view, FIG. 1C being a bottom view, and FIG. 1D being a cross-sectional view taken along a line Id-Id of FIG. 1A.
Figure 1B:
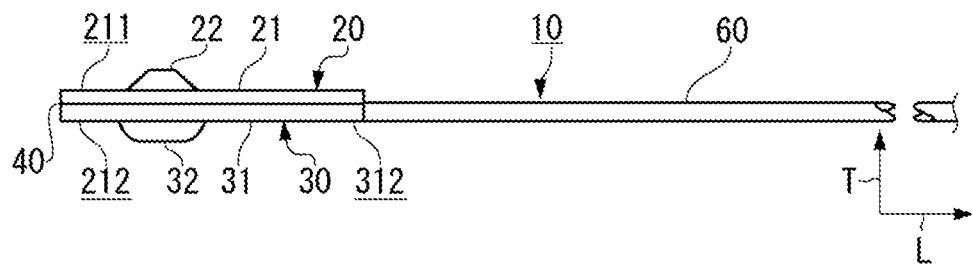

As illustrated in FIGS. 1A to 1D, the infrared temperature sensor 10 includes a sensor case 20, a sensor cover 30 (FIG. 1B) that is assembled to a rear surface 212 (see FIG. 1B and FIG. 2B) side of the sensor case 20, a heat conversion film 40 (FIG. 1D) that is held between the sensor case 20 and the sensor cover 30, an infrared detection element 43 that is held by a part of the heat conversion film 40 and detects infrared rays radiated from the roller 2, and a temperature compensation element 45 that is held by a part of the heat conversion film 40 and detects atmospheric temperature. Note that, as illustrated in FIGS. 1A to 1D, in the infrared temperature sensor 10 according to the present embodiment, a side from which electric wires 60 are drawn out is defined as rear R, and a side opposite thereto is defined as front F. Further, a direction connecting the front F and the rear R is defined as a longitudinal direction L (front-rear direction), and a direction orthogonal to the longitudinal direction L is defined as a width direction W. The above-described definitions are also applied to the sensor case 20 and the sensor cover 30. Note that a thickness direction T that is orthogonal to the longitudinal direction L and the width direction W is illustrated in FIG. 1B and the like.

Components of the infrared temperature sensor 10 are described below.

[Sensor Case 20]

Figure 2A:
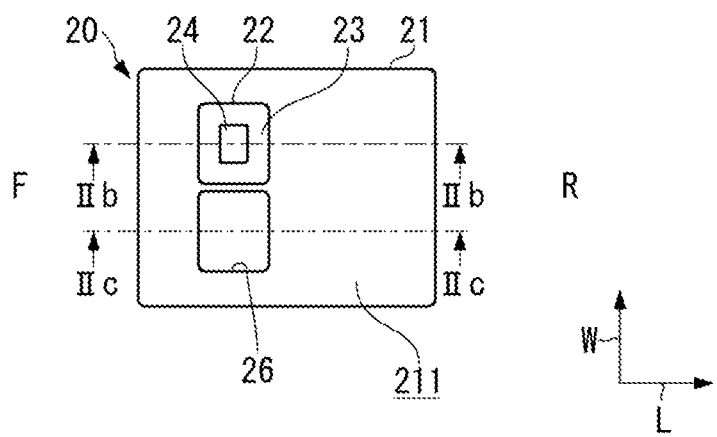
FIGS. 2A to 2C each illustrate a sensor case according to the present embodiment, FIG. 2A being a plan view as viewed from a front surface, FIG. 2B being a cross-sectional view taken along a line IIb-IIb of FIG. 2A, and FIG. 2C being a cross-sectional view taken along a line IIc-IIc of FIG. 2A.

As illustrated in FIG. 2A, the sensor case 20 includes a case base portion 21 that includes a rectangular planar shape, a light shielding dome 22 that protrudes from a front surface 211 of the case base portion 21, and an infrared entrance window 26 that is provided adjacently to the light shielding dome 22 in the width direction W and includes a rectangular planar opening shape. When the infrared temperature sensor 10 is disposed at a predetermined position with respect to the toner fixer 1, the front surface 211 of the sensor case 20 is disposed to face the roller 2 as illustrated in FIGS. 4A and 4B.

Figure 2B:
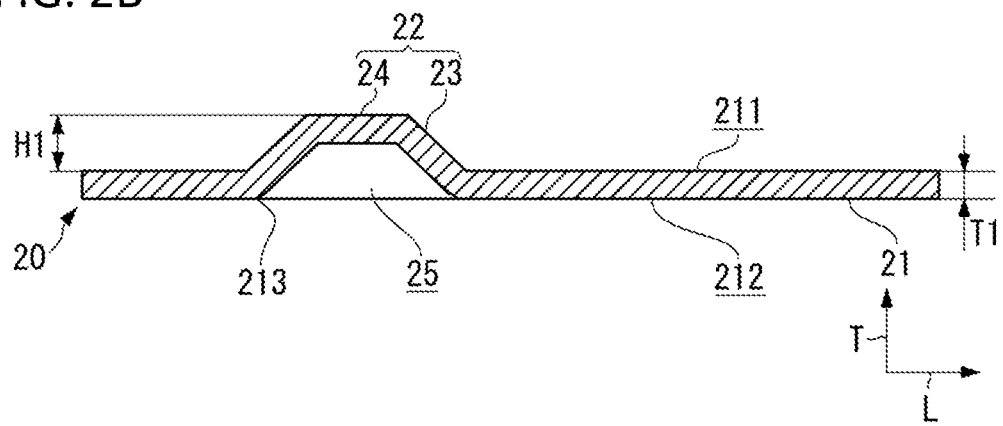

As illustrated in FIGS. 2A and 2B, the case base portion 21 includes the front surface 211 and the rear surface 212 that is located on a side opposite to the front surface 211. The front surface 211 and the rear surface 212 according to the present embodiment each include a flat surface except for parts corresponding to the light shielding dome 22 and the infrared entrance window 26.

As illustrated in FIGS. 2A and 2B, the light shielding dome 22 includes an outer shell formed in a truncated square pyramid shape. The light shielding dome 22 includes a side wall 23 that is inclinedly erected from the case base portion 21, and an upper wall 24 that connects a front end of the side wall 23. The light shielding dome 22 has a height H1 from the front surface 211. An inclination angle of the side wall 23 is optional, and is changeable afterward for calibration of detection sensitivity or the like. Adjusting the inclination angle makes it possible to adjust characteristics of individual infrared temperature sensor 10.

Figure 1C:
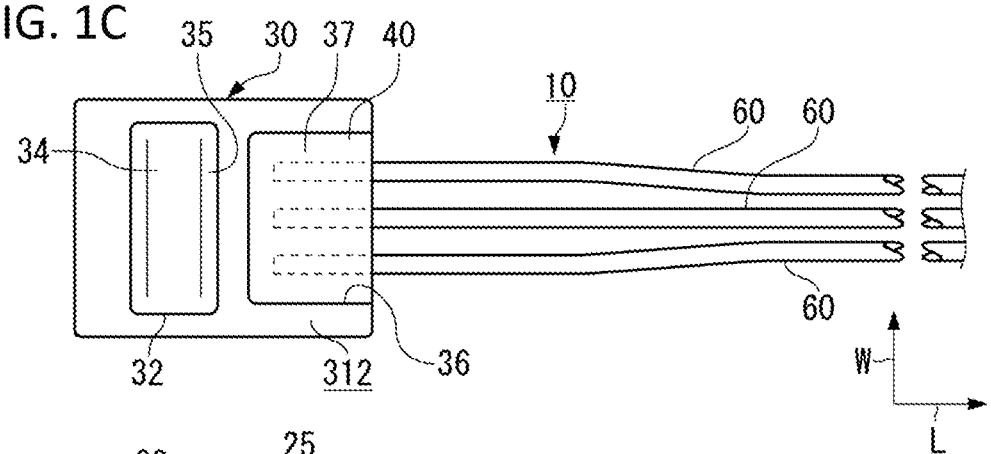
Figure 1D:
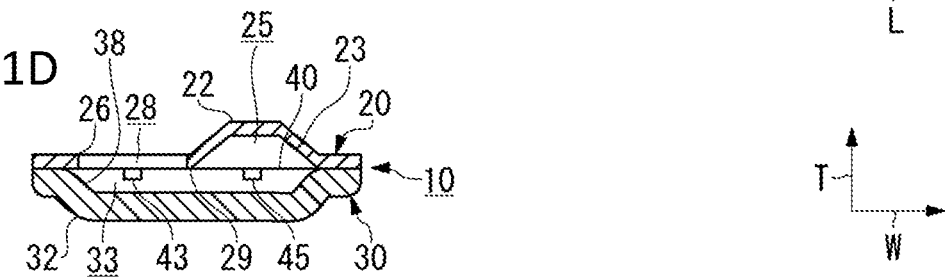

As illustrated in FIG. 2B, a truncated square pyramid-shaped space inside the light shielding dome 22 forms a light shielded region 25. The front surface 211 side of the light shielded region 25 is closed by the side wall 23 and the upper wall 24 with respect to outside; however, the rear surface 212 side thereof is open to the outside. In a state where the sensor cover 30 is assembled to the sensor case 20, however, the open part is also closed by the heat conversion film 40 that is interposed between the sensor case 20 and the sensor cover 30 as illustrated in FIG. 1D.

Since the light shielded region 25 includes the truncated square pyramid-shaped space, the light shielded region 25 includes a rectangular planar shape. Dimensions of the rectangle are continuously increased from the upper wall 24 toward the rear surface 212, and become the maximum at a peripheral edge 213 at which the light shielding dome 22 communicates with the rear surface 212. As described above, the light shielded region 25 includes a space tapered from the rear surface 212 toward the upper wall 24, namely, toward the front end.

Figure 2C:
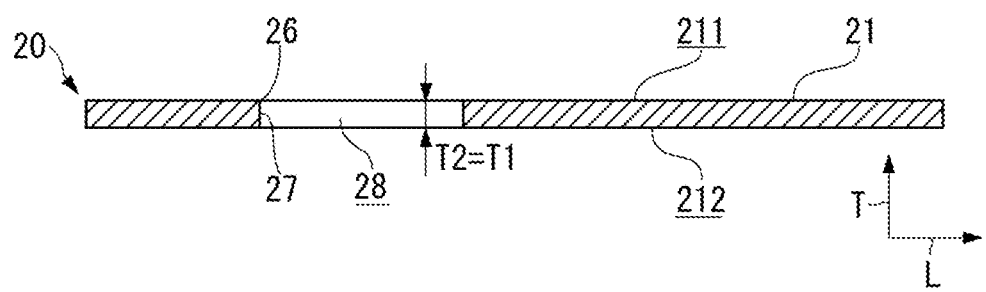

Next, as illustrated in FIGS. 2A and 2C, the infrared entrance window 26 is located on the front surface 211 of the case base portion 21.

A light guiding region 28 is provided in the case base portion 21. The light guiding region 28 communicates with the infrared entrance window 26 by penetrating through the infrared entrance window 26 as the opening on the front surface 211 to the rear surface 212. Further, as illustrated in FIG. 2C, the light guiding region 28 is surrounded by a side wall 27 that connects the front surface 211 and the rear surface 212 of the case base portion 21. A light guide length T2 of the light guiding region 28 is equal to a thickness T1 of the case base portion 21.

Each of the infrared entrance window 26 and the light guiding region 28 includes a rectangular planar shape that is similar to a planar shape of the light shielded region 25 of the light shielding dome 22 and is substantially congruent with a rectangular shape of a peripheral edge 213 of the light shielded region 25.

As illustrated in FIG. 2A, both of the infrared entrance window 26 and the light guiding region 28, and the light shielding dome 22 are arranged side by side with a small interval in the width direction W such that respective one sides face each other and respective center parts in the longitudinal direction L are coincident with each other.

As illustrated in FIG. 1D, a skirt part of the side wall 23 located at a boundary between the light guiding region 28 and the light shielded region 25 functions as a partition wall 29 that partitions the light guiding region 28 and the light shielded region 25. The infrared rays radiated from the roller 2 enter the heat conversion film 40 only through the light guiding region 28. The infrared rays are not leaked from the light guiding region 28 to an inside of the partition wall 29, namely, to the light shielded region 25.

The sensor case 20 includes the infrared entrance window 26 and the light guiding region 28 that are provided eccentrically to a front side of the case base portion 21, and the case base portion 21 on a rear side of the infrared entrance window 26 and the light guiding region 28 includes an empty space. A region of the empty space corresponds to a notch 36 of the sensor cover 30 described later.

In the sensor case 20, the case base portion 21, the light shielding dome 22, and the light guiding region 28 including the infrared entrance window 26 are integrally formed of a metal material with high thermal conductivity, such as aluminum and copper. In the present embodiment, for example, machine processing is performed on a plate material containing an aluminum alloy to integrally form the sensor case 20. More specifically, a predetermined range of the case base portion 21 is stamped to form the infrared entrance window 26 and the light guiding region 28, and a predetermined range of the case base portion 21 is plastically deformed by press processing to form the light shielding dome 22. As a result, the sensor case 20 is fabricated. Accordingly, in the sensor case 20, the case base portion 21 and the light shielding dome 22 have the constant thickness T1.

The sensor cover 30 described later is also integrally formed by performing stamping and press processing on a plate material containing a metal material with high thermal conductivity. As described above, the sensor case 20 and the sensor cover 30 are formed of the metal with high thermal conductivity, which contributes to that the temperature of the entire infrared temperature sensor 10 rapidly becomes uniform following the ambient temperature change.

In the sensor case 20, the height H1 of the light shielding dome 22 is equivalent to or about several times the thickness T1 of the case base portion 21. When the thickness T1 of the case base portion 21 is, for example, 0.5 mm, the height H1 is suppressed to about 0.5 mm to about 2.0 mm. Since the thickness of the upper wall 24 is equivalent to the thickness T1 of the case base portion 21, the height of the light shielded region 25 is equivalent to the height H1.

As described above, the sensor case 20 is an extremely thin member including the thickness that is about several times the thickness T1 of the case base portion 21. Further, only the light shielding dome 22 with a small height is provided adjacently to one side of the infrared entrance window 26 around the infrared entrance window 26.

Further, in the present embodiment, the planar shape of the light shielded region 25 and the planar shape of the light guiding region 28 are substantially congruent with each other on the rear surface 212 side. Therefore, a volume of the light shielded region 25 and a volume of the light guiding region 28 are equivalent to each other. The term equivalent used herein includes, in addition to coincidence of the volume between the light shielded region 25 and the light guiding region 28, a difference up to about 30% of the volume between the light shielded region 25 and the light guiding region 28. The difference is preferably equal to or lower than 20%, and is preferably equal to or lower than 10%.

[Sensor Cover 30]

Next, the sensor cover 30 is described.

As illustrated in FIGS. 3A to 3D, the sensor cover 30 includes a cover base portion 31 including a rectangular planar shape and an element accommodating dome 32 (element accommodating portion) protruded from a rear surface 312 of the cover base portion 31.

Figure 3A:
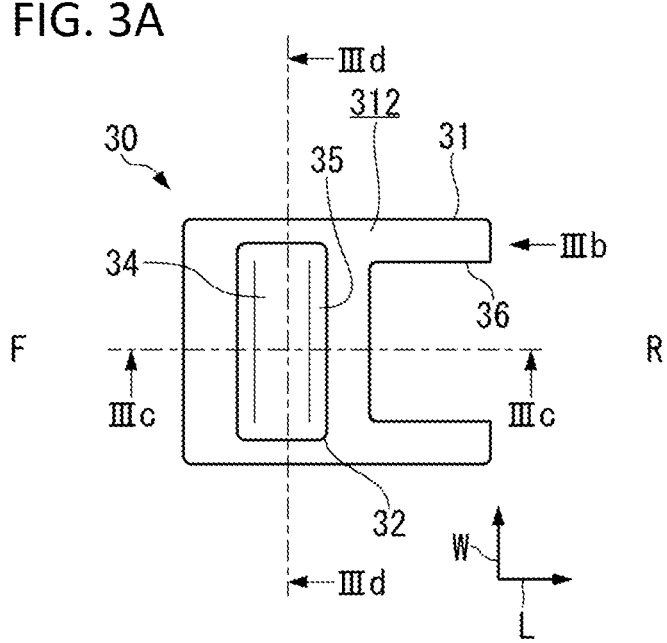
FIGS. 3A to 3D each illustrate a sensor cover according to the present embodiment, FIG. 3A being a plan view as viewed from a rear surface, FIG. 3B being a side view as viewed from IIIb direction of FIG. 3A, FIG. 3C being a cross-sectional view taken along a line IIIc-IIIc of FIG. 3A, and FIG. 3D being a cross-sectional view taken along a line IIId-IIId of FIG. 3A.
Figure 3B:
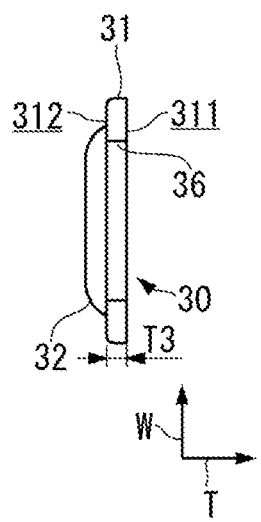

As illustrated in FIGS. 3A and 3B, the cover base portion 31 includes a front surface 311 and the rear surface 312 that is located on a side opposite to the front surface 311. Note that, when the sensor cover 30 is assembled to the sensor case 20, the rear surface 212 of the sensor case 20 and the front surface 311 of the sensor cover 30 are abutted to each other. As illustrated in FIGS. 1A and 1C, the cover base portion 31 is formed such that a dimension of a planar outer shape of the cover base portion 31 is coincident with a dimension of an outer shape of the case base portion 21 of the sensor case 20.

Figure 3C:
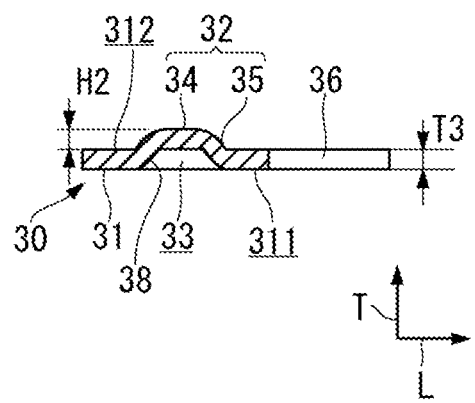

As illustrated in FIGS. 3A to 3C, the cover base portion 31 includes the notch 36. The notch 36 is formed by stamping a predetermined range forward of a rear end of the cover base portion 31 in a substantially U-shape except for predetermined ranges on both ends in the width direction W.

Figure 3D:
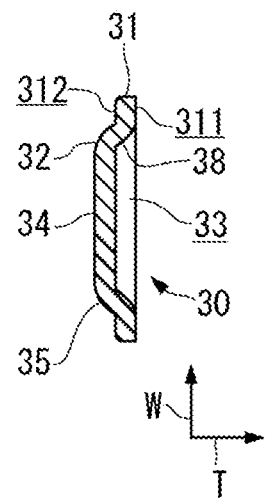

As illustrated in FIGS. 3C and 3D, an outer shell of the element accommodating dome 32 is formed in a truncated square pyramid shape. The element accommodating dome 32 includes a side wall 35 that is inclinedly erected from the cover base portion 31, a rectangular bottom floor 34 that connects a front end of the side wall 35, and a rectangular opening 38 that receives the infrared detection element 43 and the temperature compensation element 45. As illustrated in FIG. 3C, the element accommodating dome 32 has a height H2 from the rear surface 312.

The element accommodating dome 32 is formed such that a dimension in the width direction W is substantially coincident with a total dimension of the light shielding dome 22 and the infrared entrance window 26 of the sensor case 20 in the width direction W, and a dimension in the longitudinal direction is substantially coincident with a dimension of each of the light shielding dome 22 and the infrared entrance window 26 in the longitudinal direction L. Further, when the sensor case 20 is assembled to the sensor cover 30, the light shielding dome 22 and the infrared entrance window 26 are wholly included in a projection surface of the element accommodating dome 32.

As illustrated in FIGS. 3C and 3D, a truncated square pyramid-shaped space inside the element accommodating dome 32 forms an element accommodating chamber 33. The front surface 311 side of the element accommodating chamber 33 is open to the outside; however, the rear surface 312 side thereof is closed by the side wall 35 and the bottom floor 34 with respect to the outside. In the state where the sensor case 20 is assembled to the sensor cover 30, however, the open part is also closed by the heat conversion film 40 that is interposed between the sensor cover 30 and the sensor case 20 as illustrated in FIG. 1D.

The element accommodating dome 32 and the light shielding dome 22 of the sensor case 20 are not limited to the rectangular planar shape in the present embodiment, and are formable in an appropriate planar shape such as a circle, an ellipse, and an oval. The shapes of the side wall 23 of the light shielding dome 22 and the side wall 35 of the element accommodating dome 32 are also changed according to the shapes in a planar view. For example, the element accommodating dome 32 may include a circular bottom floor 34 and a circular opening 38 that receives the infrared detection element 43 and the temperature compensation element 45, and may be formed in a truncated conical shape. In a case where the element accommodating dome 32 and the light shielding dome 22 are symmetrically formed, it is sufficient to also form the light shielding dome 22 in a truncated conical shape.

As illustrated in FIG. 1D, the infrared detection element 43 and the temperature compensation element 45 are disposed inside the element accommodating dome 32 (element accommodating chamber 33). In the element accommodating chamber 33, the infrared detection element 43 and the temperature compensation element 45 are not in direct contact with the bottom floor 34 of the element accommodating dome 32. The air contained in the element accommodating chamber 33 functions as a heat insulation layer that minimizes thermal influence on the infrared detection element 43 and the temperature compensation element 45 from the outside, in particular, from a rear side of the infrared temperature sensor 10. The heat insulation layer by the air is desirably provided; however, the present invention does not eliminate a form in which the infrared detection element 43 and the temperature compensation element 45 come into direct contact with the sensor cover 30. Note that, if the element accommodating chamber 33 communicates with the outside, foreign matters may enter the element accommodating chamber 33 from the outside to adversely affect characteristics of the infrared detection element 43 and the temperature compensation element 45. Therefore, the element accommodating chamber 33 desirably includes sealability from the outside with a degree of preventing entry of foreign matters.

Again as illustrated in FIGS. 3A to 3D, a thickness T3 of each of the cover base portion 31, the side wall 35, and the bottom floor 34 of the sensor cover 30 is optional; however, the thickness T3 is preferably set to be equal to or larger than a thickness of each of the electric wires 60 in order to fit the electric wires 60 within a thickness range of the cover base portion 31 when the electric wires 60 are drawn around to the notch 36. For example, when a diameter of each of the electric wires 60 is 1 mm, the thickness T3 of the cover base portion 31 is set to be equal to or larger than 1 mm. Necessary rigidity is normally provided to the sensor case 20 even when the thickness T1 of the sensor case 20 is made smaller than the thickness of each of the electric wires 60. Therefore, it is possible to make the sensor case 20 thinner than the sensor cover 30. Note that, if the notch 36 is provided on the sensor case 20 side, the thickness relationship becomes reverse.

In the sensor cover 30, the height H2 of the element accommodating dome 32 is equivalent to the thickness T3 of the cover base portion 31. When the thickness T3 of the cover base portion 31 is, for example, about 1 mm to about 2 mm, the height H2 is suppressed to about 1 mm to about 4 mm.

As described above, the sensor cover 30 is an extremely thin member including the thickness that is about twice the thickness T3 of the cover base portion 31.

[Heat Conversion Film 40]

When irradiated with the infrared rays, the heat conversion film 40 (FIG. 1D) converts energy of the infrared rays into heat. When the converted heat is transferred to the infrared detection element 43, the infrared detection element 43 detects temperature.

The heat conversion film 40 holds the infrared detection element 43 and the temperature compensation element 45. Note that the infrared detection element 43 and the temperature compensation element 45 are electrically connected to an unillustrated wiring pattern on the heat conversion film 40. As illustrated in FIG. 1C, the electric wires 60 are connected to terminals of the wiring pattern. The electric wires 60 are drawn out to the outside from an electric wire fixing region 37 (FIG. 1C) along the longitudinal direction L.

The heat conversion film 40 is formed in a shape substantially coincident with the outer shapes of the sensor case 20 and the sensor cover 30. The heat conversion film 40 supports the infrared detection element 43 and the temperature compensation element 45. In addition, the heat conversion film 40 is disposed over both of the light guiding region 28 and the light shielded region 25 to which the infrared rays do not enter, in order to make thermal influence on the infrared detection element 43 and thermal influence on the temperature compensation element 45 (excluding thermal influence caused by direct radiation of infrared rays) equivalent to each other.

When the heat conversion film 40 is held between the sensor case 20 and the sensor cover 30, the infrared detection element 43 and the temperature compensation element 45 are disposed inside the element accommodating chamber 33 of the sensor cover 30 as illustrated in FIG. 1D. In particular, in the present embodiment, the infrared detection element 43 and the temperature compensation element 45 are disposed at line-symmetric positions about a center of the infrared temperature sensor 10 in the width direction W. More specifically, the infrared detection element 43 and the temperature compensation element 45 are line-symmetrically arranged about a center line C1 (FIG. 1A) that bisects the infrared temperature sensor 10 in the width direction W. The center line C1 is located at the boundary between the light guiding region 28 and the light shielded region 25.

The heat conversion film 40 is formed of a resin containing a polymer material. The kind of the resin is not limited as long as the resin absorbs the infrared rays, and well-known resins such as PPS (polyphenylene sulfide), polyimide, polyester, and polyethylene may be used. Further, a material other than the resin may be used as long as the material absorbs the infrared rays.

The thickness of the heat conversion film 40 is optional; however, the thickness of the heat conversion film 40 is preferably about 5 μm to about 50 μm in order to improve infrared absorptance and to prevent occurrence of wrinkles in a work causing the heat conversion film 40 to be held between the sensor case 20 and the sensor cover 30.

[Infrared Detection Element 43 and Temperature Compensation Element 45]

The infrared detection element 43 detects temperature raised by heat that occurs when the infrared rays radiated from the surface of the roller 2 as the detection object are absorbed by the heat conversion film 40. The temperature compensation element 45 detects atmospheric temperature.

As the infrared detection element 43 and the temperature compensation element 45, a small resistor including a temperature coefficient, such as a thin film thermistor and a platinum temperature sensor is widely used without being limited to a specific material and a specific form.

The infrared detection element 43 detects temperature under thermal influence by the atmospheric temperature (including sensor case 20 and sensor cover 30) in addition to the infrared rays radiated from the roller 2. The temperature compensation element 45 detects temperature under thermal influence by the atmospheric temperature. Therefore, conceptually, the thermal influence on each of the elements as described below is ideal.

infrared detection element−temperature compensation element=("direct radiation"+"thermal conduction"+"convection"+"re-radiation")−("thermal conduction"+"convection"+"re-radiation")

At this time, among the thermal influence from the detection object, a difference between the influence on the infrared detection element 43 and the influence on the temperature compensation element 45 is only "direct radiation" of the infrared rays. Therefore, it is possible to accurately detect the infrared rays radiated from the detection object, based on the difference between the detected temperature by the infrared detection element 43 and the detected temperature by the temperature compensation element 45. This, however, is based on premise that the thermal influence by "thermal conduction"+"convection"+"re-radiation" on the infrared detection element 43 and the thermal influence by "thermal conduction"+"convection"+"re-radiation" on the temperature compensation element 45 are equal to each other.

Accordingly, it is desirable to make the thermal influence by the thermal conduction, the convection, and the re-radiation on the infrared detection element 43 and the temperature compensation element 45 equal to each other.

[Infrared Temperature Sensor 10]

As illustrated in FIGS. 1A to 1D, in the infrared temperature sensor 10, the sensor case 20 and the sensor cover 30 are positioned such that peripheral edges of the respective base portions 21 and 31 are coincident with each other, and are joined with the heat conversion film 40 in between.

When the heat conversion film 40 is held by the sensor case 20 and the sensor cover 30, the infrared detection element 43 is disposed at a substantially center of the light guiding region 28, and the temperature compensation element 45 is disposed at a substantially center of the light shielded region 25, in a planar view. According to the present embodiment, as described later, it is possible to make the thermal influence on the infrared detection element 43 and the thermal influence on the temperature compensation element 45 substantially equivalent to each other, excluding irradiation of the infrared rays from the roller 2.

Further, when the sensor case 20 and the sensor cover 30 are assembled to each other, the electric wire fixing region 37 is formed by the notch 36 of the cover base portion 31 and the case base portion 21 in a region facing the notch 36. The electric wires 60 drawn out to the outside are fixed to the electric wire fixing region 37. In other words, as illustrated in FIG. 1C, the electric wires 60 connected to the wiring pattern on the heat conversion film 40 described above are disposed in a space surrounded by the rear surface 212 of the case base portion 21 and the notch 36, and a mold resin is applied from above the electric wires 60 to fix the electric wires 60 to the infrared temperature sensor 10. As the resin used to fix the electric wires 60, a well-known resin such as an epoxy resin may be used.

Note that, in the present embodiment, since the thickness T3 of the cover base portion 31 is equal to or larger than the thickness of each of the electric wires 60, outer peripheral surfaces of the respective electric wires 60 are not protruded from the rear surface 312 of the cover base portion 31 as illustrated in FIG. 1B.

As illustrated in FIGS. 4A and 4B, the infrared temperature sensor 10 is disposed such that the front surface 211 side of the sensor case 20 faces the roller 2 as the detection object. Accordingly, the case base portion 21 is disposed between the electric wire fixing region 37 and the roller 2, which makes it possible to prevent the infrared rays radiated from the roller 2 from being applied to the fixing resin. Further, in a case where the mold resin is peeled from the electric wire fixing region 37, it is possible to prevent the mold resin from scattering to the roller 2.

Although not illustrated, the infrared temperature sensor 10 includes a temperature detection circuit. The detection circuit is optional, and for example, a well-known detection circuit disclosed in Patent Literature 1 is usable. Further, the same is true of a procedure of temperature detection.

[Operation of Infrared Temperature Sensor 10]

Next, operation of the infrared temperature sensor 10 is described.

As illustrated in FIG. 4B, the infrared temperature sensor 10 is disposed in parallel to a rotation axis C of the roller 2 such that temperature gradient of the infrared detection element 43 and temperature gradient of the temperature compensation element 45 become equal to each other with respect to the roller 2 as a heat source. The width direction W in which infrared detection element 43 and temperature compensation element 45 are arranged side by side is parallel to rotation axis C. Note that the infrared temperature sensor 10 is not necessarily strictly parallel to the rotation axis C and slight deviation is allowed. A distance from the surface of the roller 2 to the infrared detection element 43 and a distance from the surface of the roller 2 to the temperature compensation element 45 are preferably coincident with or substantially coincident with each other.

Further, convection is caused by heat generation of the roller 2 as the fixing means of the toner fixer 1, or the like.

The infrared rays radiated from the roller 2 to the infrared temperature sensor 10 are taken in from the infrared entrance window 26 (FIG. 1D), and are radiated to the heat conversion film 40 through the light guiding region 28. When the infrared rays radiated from the surface of the roller 2 reach the heat conversion film 40 through the light guiding region 28 as described above, the infrared rays are absorbed by the heat conversion film 40 and energy of the infrared rays is converted into heat. The converted heat is transferred to the infrared detection element 43 to raise the temperature of the infrared detection element 43.

Further, the infrared rays radiated from the roller 2 toward the infrared temperature sensor 10 are also radiated to the side wall 23 and the upper wall 24 of the light shielding dome 22, and the case base portion 21. Furthermore, each of those elements is influenced by the convection caused by the heat generation of the roller 2 or the like.

The light guiding region 28 that communicates with the infrared detection element 43 and the light shielded region 25 on which the temperature compensation element 45 is located are formed in substantially symmetric shapes to each other. The substantially symmetric shapes used herein indicate that the shapes and the dimensions of the light guiding region 28 and the light shielded region 25 are equivalent to each other in a planar view.

Further, in the present embodiment, the infrared detection element 43 and the temperature compensation element 45 are symmetrically disposed. The symmetry in position used herein indicates that, in FIG. 1D, the infrared detection element 43 and the temperature compensation element 45 are disposed at positions line-symmetric to each other with a lower end part of the partition wall 29 as a symmetry axis (located on center line C1 in FIG. 1A). Examples of the line-symmetric positions include a case where the infrared detection element 43 is disposed at the center of the light guiding region 28 and the temperature compensation element 45 is disposed at the center of the light shielded region 25 in a planar view as with the present embodiment, and a case where the infrared detection element 43 and the temperature compensation element 45 are brought close to the partition wall 29 from the center, or separated from the partition wall 29 as well. Further, other examples thereof include a case where the infrared detection element 43 and the temperature compensation element 45 are both displaced in any one direction of the longitudinal direction L from the center.

In the present embodiment, since the sensor case 20 and the sensor cover 30 are formed of the metal material with high thermal conductivity, the infrared temperature sensor 10 is equally heated. In addition, the light guiding region 28 on which the infrared detection element 43 is located and the light shielded region 25 on which the temperature compensation element 45 is located are formed in the substantially symmetric shapes, and the infrared detection element 43 and the temperature compensation element 45 are disposed at the positions substantially symmetric to each other. This allows the entire infrared temperature sensor 10 to equally receive "thermal conduction"+"convection"+"re-radiation" from the roller 2, and equivalently applies thermal influence on the infrared detection element 43 and the temperature compensation element 45 that detect the temperature.

When the infrared detection element 43 and the temperature compensation element 45 are formed in the substantially symmetric shapes, and the infrared detection element 43 and the temperature compensation element 45 are disposed at the positions symmetric to each other as with the present embodiment, the infrared detection element 43 and the temperature compensation element 45 both can equivalently receive "thermal conduction"+"convection"+"re-radiation" from the roller 2.

Accordingly, the difference between the thermal influence on the infrared detection element 43 and the thermal influence on the temperature compensation element 45 is only "direct radiation" of the infrared rays, which allows for accurate detection of the infrared rays radiated from the roller 2. In other words, the influence of "direct radiation" is outputted as a variation difference of the resistance values.

[Effects of Infrared Temperature Sensor 10]

Effects achieved by the infrared temperature sensor 10 are described.

In the infrared temperature sensor 10, the light guiding region 28 and the light shielded region 25 are formed in the substantially symmetric shapes, and the infrared detection element 43 and the temperature compensation element 45 are disposed at the positions symmetric to each other in the width direction W. This makes it possible to make heat energy received by the infrared detection element 43 and heat energy received by the temperature compensation element 45 equivalent to each other, excluding irradiation of the infrared rays. Accordingly, the infrared temperature sensor 10 can accurately detect only heat energy caused by the irradiation of the infrared rays by calculating the difference between the detected temperature by the infrared detection element 43 and the detected temperature by the temperature compensation element 45.

Next, the infrared temperature sensor 10 around the infrared entrance window 26 includes a flat surface except for the light shielding dome 22, and a part that blocks the infrared rays radiated from the roller 2 toward the infrared temperature sensor 10 from entering the light guiding region 28 through the infrared entrance window 26 is not present except for the light shielding dome 22. Accordingly, even when the infrared entrance window 26 is small, it is possible to secure an amount of the infrared rays taken into the light guiding region 28.

Figure 5A:
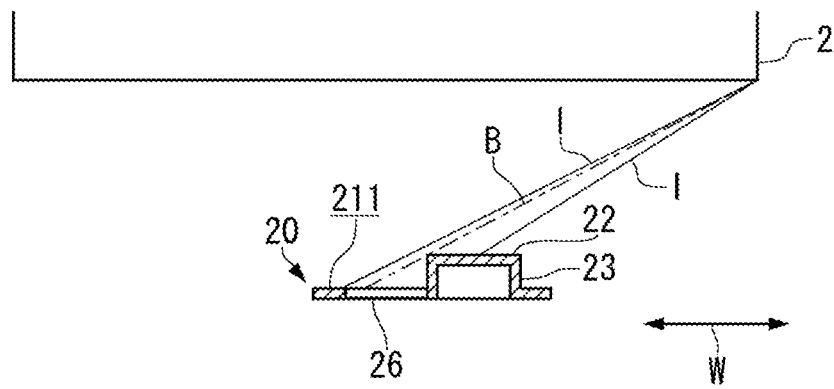
FIGS. 5A to 5C are diagrams to explain effects of the infrared temperature sensor according to the present embodiment, in which illustration of a light shielding dome 22 is omitted in FIG. 5C.
Figure 5B:
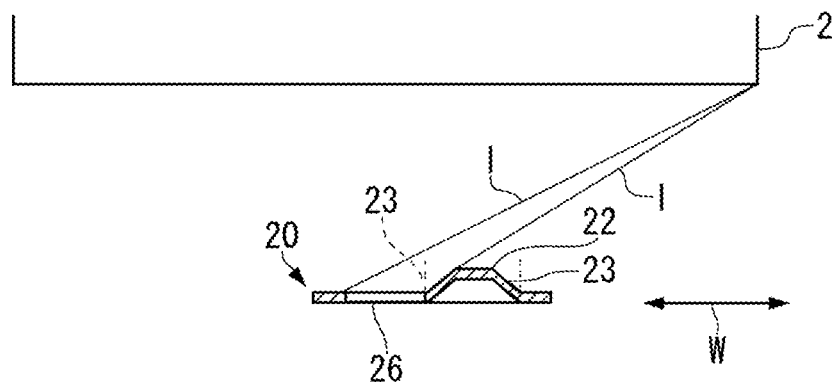
Figure 5C:
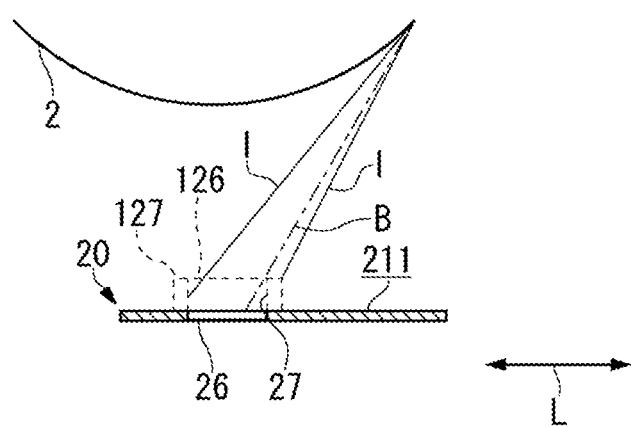

For example, it is assumed that, as illustrated by a dashed line in FIG. 5C, a side wall 127 is protruded from the front surface 211, and an infrared entrance window 126 is open at a front end of the side wall 127. This assumes the infrared temperature sensor disclosed in Patent Literature 1. According to the form, a part of infrared rays I entering the infrared entrance window 126 is blocked by the side wall 127, below a boundary B illustrated by an alternate long and short dash line in FIG. 5C. In contrast, since the infrared entrance window 26 according to the present embodiment opens on the front surface 211, the infrared rays I radiated from the roller 2 are not blocked and enter the infrared entrance window 26 as illustrated in FIG. 5C.

The light shielding dome 22 becomes an element that blocks the infrared rays entering the infrared entrance window 26; however, the light shielding dome 22 includes a shape tapered toward the upper wall 24 and the side wall 23 is inclined. This allows the infrared rays radiated from the roller 2 toward the infrared temperature sensor 10 to enter the infrared entrance window 26 without blocking the infrared rays as much as possible, depending on an angle of the side wall 23 as illustrated in FIG. 5B.

In contrast, when the side wall 23 is perpendicularly erected from the front surface 211 as illustrated in FIG. 5A, the infrared rays I are blocked below the boundary B illustrated by an alternate long and short dash line in FIG. 5A. The light shielding dome 22, however, has the height H1 that is about several times the thickness T1 of the case base portion 21. Therefore, even if the side wall 23 is perpendicularly erected, a degree of blocking the infrared rays is originally small.

The infrared temperature sensor 10 achieves the following effects because the height H1 of the light shielding dome 22 is as low as about several times the thickness T1 of the case base portion 21.

The infrared temperature sensor 10 measures the temperature by converting the infrared rays radiated from the roller 2 into heat by the heat conversion film 40. Therefore, the distance from the roller 2 to the infrared temperature sensor 10 becomes a distance between the roller 2 and the heat conversion film 40 that directly receives the infrared rays. Accordingly, when the height H1 of the light shielding dome 22 is made lower, it is possible to lengthen the distance from the roller 2 to the upper wall 24 of the light shielding dome 22, and to accordingly suppress thermal influence from the light shielding dome 22 on the heat conversion film 40. In other words, since the thermal influence received by the infrared temperature sensor 10 from the roller 2 is small because of the low height H1, it is unnecessary to form the sensor case 20 and the sensor cover 30 by an expensive metal material with high heat resistance.

Next, the light shielded region 25 and the light guiding region 28 directly face the metal material configuring the sensor case 20, except for the open part where the heat conversion film 40 is provided. No member is disposed on the wall surface of the case base portion 21 partitioning the light guiding region 28 and on the inner wall surface of the light shielding dome 22 partitioning the light shielded region 25. This indicates that an infrared-absorbing molded product (50) that is necessary in Patent Literature 1 is eliminated in the infrared temperature sensor 10 according to the present embodiment. Therefore, according to the infrared temperature sensor 10, it is possible to reduce the number of components as compared with the conventional infrared temperature sensor, which contributes to cost reduction of the infrared temperature sensor 10.

The infrared-absorbing molded product (50) is provided in order to avoid or prevent the infrared rays reflected by an inner wall surface of a body part (22) and infrared rays emitted from the heated body part (22) from influencing the infrared detection element 43 and the temperature compensation element 45. In the infrared temperature sensor 10 according to the present embodiment, however, influence by reflection and radiation of the infrared rays described above is very small because the height of each of the side wall 23 of the light shielding dome 22 and the side wall 27 surrounding the light guiding region 28 is low and the wall area is small. This allows for elimination of the infrared-absorbing molded product (50).

Next, the sensor cover 30 achieves the following effects because the side wall 35 surrounding the infrared detection element 43 and the temperature compensation element 45 is inclined with respect to the cover base portion 31.

In a case where the distance from each of the elements 43 and 45 to the bottom floor 34 facing the elements 43 and 45 is fixed, when the side wall 35 is inclined, the volume inside the element accommodating dome 32 (element accommodating chamber 33) is suppressed to small as compared with a case where the side wall 35 is provided perpendicular to the cover base portion 31.

The distance from each of the elements 43 and 45 to a part of the sensor cover 30 facing the elements 43 and 45 is determined by a withstand voltage not causing short-circuit between each of the elements 43 and 45 and the sensor cover 30 and a slight margin. Further, the internal temperature of the element accommodating dome 32 rapidly follows the temperature change around the element accommodating dome 32 as the volume inside the element accommodating dome 32 is smaller, and the internal temperature is detected by the elements 43 and 45.

Accordingly, the side wall 35 of the sensor cover 30 is inclined, which makes it possible to improve responsiveness of the infrared temperature sensor 10 while keeping a distance necessary for securing the withstand voltage between each of the elements 43 and 45 and the sensor cover 30.

In addition, the fact that the sensor cover 30 includes the side wall 35 inclinedly erected from the cover base portion 31 is advantageous in manufacturing of the sensor cover 30. When the side wall 35 is inclinedly erected from the cover base portion 31, the sensor cover 30 is easily released from the mold in formation of the sensor cover 30 by press processing or injection molding. Accordingly, it is possible to suppress deformation of the sensor cover 30 released from the mold and to avoid the deformation of the sensor cover 30 from influencing detection accuracy. The inclined side wall 35 makes it possible to prevent, for example, change of the measurement value caused by the fact that hot air generated by the heat source is blown to the sensor cover 30 to directly influence the elements 43 and 45.

Next, in the infrared temperature sensor 10, the sensor case 20 and the sensor cover 30 are fabricated by stamping and press processing. This makes it possible to manufacture the infrared temperature sensor 10 at a lower cost as compared with a case where the sensor case 20 and the sensor cover 30 are fabricated by, for example, casting.

Further, the protruding height H1 of the light shielding dome 22 and the protruding height H2 of the element accommodating dome 32 are as low as about several times the thickness of the case base portion 21 and the thickness of the cover base portion 31. This makes it possible to suppress the entire thickness of the infrared temperature sensor 10.

Although the present invention has been described above based on the preferred embodiment, the configurations described in the above-described embodiment may be selected or appropriately modified into other configurations without departing from the scope and spirit of the present invention.

For example, in the present embodiment, the light guiding region 28 and the light shielded region 25 are partitioned by the partition wall 29 at the skirt part of the side wall 23. Further, increasing the distance between the light guiding region 28 and the light shielded region 25 allows the case base portion 21 to be included in the partition wall.

Further, the side wall 23 in the present embodiment is erected from the case base portion 21 while the entire periphery thereof is inclined; however, it is sufficient that at least a region adjacent to the light guiding region 28 is inclined. Also in this form, it is possible to reduce the degree of blocking the infrared rays from entering the infrared entrance window 26.

Applications of the infrared temperature sensor according to the present invention are not limited, and the infrared temperature sensor according to the present invention may be used as a so-called high-cut sensor that is used to urgently stop the operation of the toner fixer 1 when the temperature of the detection object, for example, the temperature of the roller 2 is excessively raised, or may be used for temperature control of other detection objects.

Further, in the present invention, the metal with high thermal conductivity is desirable as the material for the sensor case 20 and the sensor cover 30; however, the present invention is not limited thereto. The sensor case 20 and the sensor cover 30 may be formed of a resin or other material as long as the material includes necessary thermal conductivity.

The infrared detection element 43 and the temperature compensation element 45 are not necessarily strictly line-symmetric to each other with the boundary between the light guiding region 28 and the light shielded region 25 as the axis as with the above-described embodiment. The present invention also includes a configuration in which the infrared detection element 43 and the temperature compensation element 45 are displaced from the line-symmetric positions with the boundary between the light guiding region 28 and the light shielded region 25 as the axis as long as the configuration achieves the object of the present invention.

Likewise, the light guiding region 28 and the light shielded region 25 are not necessarily strictly formed in the symmetric shapes. The present invention also includes a configuration in which the shapes and the dimensions of the light guiding region 28 and the light shielded region 25 are slightly different from each other as long as the configuration achieves the object of the present invention.

REFERENCE SIGNS LIST

1 Toner fixer
2, 3 Roller
10 Infrared temperature sensor
20 Sensor case
21 Case base portion
22 Light shielding dome
23 Side wall
24 Upper wall
25 Light shielded region
26 Infrared entrance window
27 Side wall
28 Light guiding region
29 Partition wall
30 Sensor cover
31 Cover base portion
32 Element accommodating dome (element accommodating portion)
33 Element accommodating chamber
34 Bottom floor
35 Side wall
36 Notch
37 Electric wire fixing region
38 Opening
40 Heat conversion film
43 Infrared detection element
45 Temperature compensation element
60 Electric wire
126 Infrared entrance window
127 Side wall
211 Front surface
212 Rear surface
213 Peripheral edge
311 Front surface
312 Rear surface
C1 Center line

The invention claimed is:

1. An infrared temperature sensor that detects temperature of a detection object in a non-contact manner, the infrared temperature sensor comprising:
  a film that is configured to absorb infrared rays radiated from the detection object and to convert the infrared rays into heat;
  an infrared detection element that is disposed on the film;
  a temperature compensation element that is disposed on the film with a predetermined interval from the infrared detection element; and
  a sensor case that includes a case base portion and is disposed to face one surface side of the film,
  wherein the case base portion of the sensor case is provided with a light guiding region and a light shielded part, the light guiding region comprising an opening penetrating though the case base portion and guiding the infrared rays to a region of the film on which the infrared detection element is disposed, the light shielded part including a truncated conical shape and formed with a light shielded region therein, the light shielded region shielding a region of the film on which the temperature compensation element is disposed from the infrared rays, and wherein the light shielded region and the light guiding region are formed in the same shapes in a planar view of the case base portion.

2. The infrared temperature sensor according to claim 1, wherein the light shielded part and the light guiding region are formed adjacent to each other in the case base portion, and the light shielded part includes an inclined region that is adjacent to at least the light guiding region.

3. The infrared temperature sensor according to claim 1, wherein the light shielded part includes a truncated square pyramid shape.

4. The infrared temperature sensor according to claim 1, wherein the light guiding region and the light shielded region are formed in substantially symmetric shapes.

5. The infrared temperature sensor according to claim 1, a volume of the light shielded region and a volume of the light guiding region are substantially the same.

6. The infrared temperature sensor according to claim 1, wherein the light shielded part includes a hollow dome.

7. The infrared temperature sensor according to claim 1, wherein the light guiding region is formed by stamping a predetermined range of the case base portion, and the light shielded part is formed by performing press processing on a part of the case base portion.

8. The infrared temperature sensor according to claim 1, further comprising a sensor cover that is disposed to face the sensor case through the film.

9. The infrared temperature sensor according to claim 1, wherein the light guiding region and the light shielded region are disposed adjacent to each other.

* * * * *